Sept. 20, 1932.　　　F. L. MORSE　　　1,878,797

LINK BELT

Filed Oct. 10, 1930

FRANK L. MORSE INVENTOR.

BY Robert V. Morse

ATTORNEY.

Patented Sept. 20, 1932

1,878,797

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

LINK BELT

Application filed October 10, 1930. Serial No. 487,796.

This invention relates to link belts used in the transmission of power, and particularly to link belts of the V type, which run in grooved pulley wheels. The principal object of the invention is to make an efficient and durable power transmitting system of this type which can run under severe conditions, such as met with for example in driving generators from the axles of railway cars, when the drive is exposed to the weather, stones and cinders from the roadbed, and often must run with the pulley wheels out of line. One object of the invention is to build an armored link belt, free from friction pads or other excresences likely to be damaged, with efficient working parts enclosed and protected within a metal shell. Another object is to form the parts so as to permit efficient manufacture in quantity production, and facilitate assembly or disassembly in the field. Another object is to prevent pinching of the working parts, so that the links may run freely under all conditions of tension and alignment.

In the past it has been customary to run link belts in metal pulley wheels having V grooves, and where additional friction was required to provide the links of the belt with pads of friction material,—the friction surface on the pulley wheel being the metal sides of the V groove. As the use of friction pads on the links is liable to cause trouble in exposed service, another object of the present invention is to overcome this difficulty, by placing the friction material in the side walls of the V grooves of the pulley wheels, instead of on the links, so that the cooperating faces of the links can be of metal. This gives an armored link belt drive without sacrificing any of the power transmitting advantages associated with the use of special friction material. Various other objects will become apparent as the description proceeds.

Referring now to the drawing forming part of this specification,

Similar reference numerals refer to similar parts throughout the various views.

Figure 1:
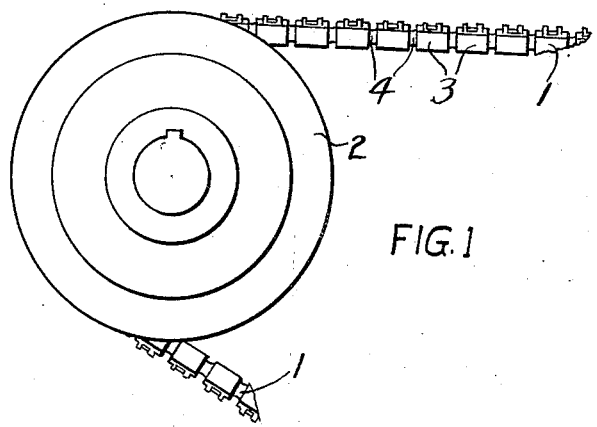
Figure 1 is a side view showing the link belt running on a pulley wheel.

Referring first to Figure 1, the link belt 1 which runs on the pulley 2 is composed of a series of friction or driving links 3 articulated by alternate interspersed connecting or tension links 4. The link belt is generally endless and may run over two or more pulleys as is customary in such drives. The ordinary link belt is generally provided with pads of friction material on the sides of the links. These friction pads are liable to cause trouble in service by becoming damaged so that they either fall off or do not fit the grooves. An improvement under the present invention consists in placing the friction material in the pulley groove instead of on the chain links.

Figure 3:
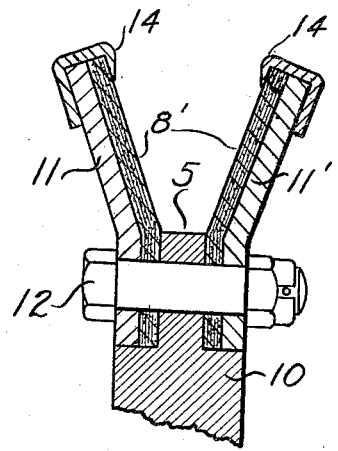
Figure 3 shows another method of mounting in the groove of the pulley wheel.
Figure 2:
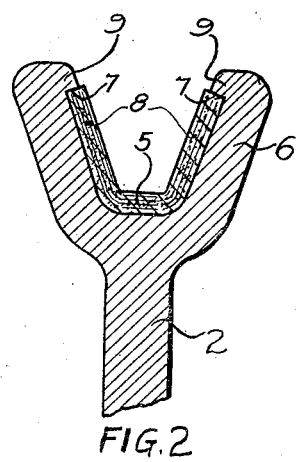
Figure 2 is a cross-section of a pulley wheel showing friction material moulded in the groove of the wheel to receive the link belt.

Examples of the pulley construction are illustrated in Figure 2 and Figure 3. Referring first to Figure 2, which shows a cross-section of the grooved portion of a pulley wheel 2, the V groove 5 in the rim 6 is undercut as at 7 and into it is forced or moulded a lining 8 of special friction material, such as used for brake linings for example. This gives a good friction surface in the pulley wheel to engage the metal sides of the driving links 3 of the link belt 1. As the link belt may often run out of line, means are provided to guide it on to the pulley without damaging the friction material 8. In Figure 2 this is accomplished by the inwardly projecting metal rim portions 9, which form rings of metal around the outside edges of the friction material 8. If the belt is running out of line, these hard rim portions 9 receive the impact of the on coming links 3 and guide them into the groove 5.

Another example of the friction lined pulley wheel is shown in Figure 3, in which a portion of the web or spoke of the pulley is indicated by the reference numeral 10. A pair of flanges 11 and 11' are secured to the rim of this pulley by any suitable means, such as the bolts 12, and are inclined outwardly to form the V groove 5, which is lined on the sides with friction material 8'. Clamping rings 14 overhang the outer edges of the flanges 11, 11' and friction material 8'. These clamping rings 14 serve the double purpose of guiding the chain belt into the pulley groove, and also hold the friction material securely in place. Various other forms of pulley, with the grooves either integral, or detachable, or one side integral, and one side detachable, may be used, as will be obvious to those skilled in the art.

Figure 6:
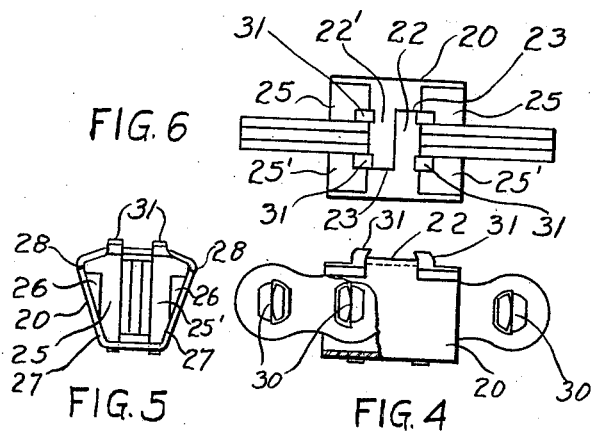
Figure 6 is a plan view of Figure 4 viewed from above.
Figures 4, 5:
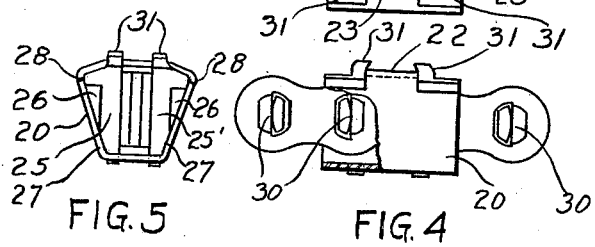
Figure 4 is a side view partly in section showing one of the friction links and two connecting links.
Figure 5 is an end elevation of Figure 4.
Figure 7:
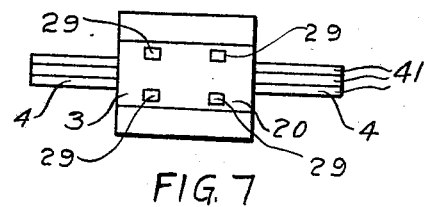
Figure 7 shows the links of Figure 4 viewed from below.

The structure of an illustrative form of the link belt 1 is shown more in detail in Figure 4, Figure 5, Figure 6, and Figure 7. It consists of an outer armor or casing 20 preferably punched from sheet or strip metal and bent in the general form of a V closed at the top, so as to fit into the V groove 5 of the pulley wheel 2 and enclose the internal working parts of the connecting links 4. The manner in which the casing 20 enwraps the internal parts is shown in Figure 5, while Figure 7 shows that the sides and lower or inner face of the driving link 3 present an unbroken armored surface.

Figure 6 shows the manner in which the upper ends 22, 22', of the casing 20 lap over across the top of the link 3 and butt against each other to lock in place. The enfolding ends 22, 22', are staggered so that each fits into the other when pressed down in place in assembling the link belt, and the metal of the casing 20 and ends, 22, 22' is sufficiently thick and square at the ends so as to afford an abutting surface at 23. The ends 22, 22' having the abutting surfaces 23 prevent the casing 20 from collapsing or yielding under the driving pressures exerted by the V groove of the pulley against the walls of the driving links 3. This construction gives a casing 20 which is easy to assemble or disassemble, and is light, strong, and well adapted to quantity manufacture. The abutting ends 22, 22' prevent the link from being pinched or cramped, and insure a flexible and easy running link belt.

In order to hold the casing 20 in its proper form and shape, there are provided within the casing 20 a pair of structural members 25 and 25' which are in general wedge shaped to conform to the inclination of the V groove of the pulley. In the form shown in Figure 5 the outer face of the wedge is notched or grooved out at 26 for lightness, so that the wedge shaped surfaces only touch the casing 20 at 27 and 28. The structural members 25, 25' have several functions in addition to supporting the casing 20. They form seats for the pins of the rocker joints 30 as will be described later, and also have projecting ridges or points 31 which can be riveted over the edges of the parts 22, 22' after they are bent down in place, thus locking the abutting ends of the parts 22, 22' securely in place.

The structural members 25, 25' are in effect parts of the hinge joints of the chain of links through which the tension is transmitted, while the casing 20 or armored housing is the friction driving member. In prior link belts a third connecting or interlocking member has been used to transmit the forces from the friction driving member to the hinge members or internal parts corresponding to the members 25, 25'. One improvement in the present invention is that by locking, riveting or welding the enwrapping casing 20 directly to the structural or hinge members 25, 25', the use of an intermediate member is dispensed with, the link belt is simplified and cheapened, and the driving forces are more directly transmitted.

In order to hold the structural or hinge members 25, 25' in their proper spaced relation at the bottom, projections 29 may be provided on the lower edge of the members 25, 25'—that is, the edge opposite to the edge having the projections 31—and these projections 29 fit into corresponding holes in the bottom of the casing 20 as shown in Figure 7,—which shows the link of Figure 4 as viewed from below.

Figure 8:
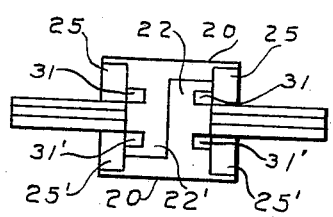
Figure 8 shows a modified form in which the enwrapping casing or armor is locked in place.

In the modification shown in Figure 8 the enfolding ends 22, 22', each have double notches which hook around the projections 31, 31', so as to lock the casing 20 against pulling apart as well as crushing together. The same result could also be obtained by welding the enfolding ends 22, 22'. The general object, in any case, is to provide a uniting armored casing wrapping around the joint or hinge members.

The friction or driving links 3 which have been described are connected to each other by interspersed tension links 4, which may be of any usual form, with either rocker or friction joints. One preferred form is illustrated in Figure 4, in which the connecting links 4 are shown provided with rocker joints 30. These rocker joints are similar to those usually found in chain construction, and consist of transverse pintle members adapted to roll or rock on each other, one member of each pair being secured to the tension link 4 and the other to the structural members 25, 25' of the driving link 3,—with appropriate clearance holes so that the joint is free to bend. These joints 30 are surrounded by the casing 20, (which is shown partly broken away in Figure 4 merely to reveal the joint construction) so that the working parts of the joint are well protected.

The tension links 4 are shown in Figure 5, Figure 6 and Figure 7 in a laminated form, being made up of three identical link plates 41 placed side by side. While this is a preferred form, owing to the greater ease with which thinner link plates can be punched in manufacture, it will be obvious that the tension link 4 might be made of any number of plates, and a single integral bar to as many plates as desired.

While in the foregoing I have described certain specific examples, it will be understood that they are merely for purposes of illustration to make clear the principles of the invention, which is not limited to the particular form shown, and is susceptible to various modifications and adaptations in different installations as will be apparent to those skilled in the art without departing from the scope of the invention as stated in the following claims.

I claim:

1. In a link belt for power transmission, the combination of an external metallic casing of the V type having metallic side walls for friction driving surfaces and extensions of said side walls bent over across the top of the V and butting against each other to resist compressive stresses, interspersed tension links, and joints located within the casings connecting the casings and tension links.

2. In a link belt for power transmission, the combination of tension links and friction drive links, said friction drive links being composed of a casing having inclined metallic side walls for friction driving surfaces, extensions of said side walls being bent across the link so as to butt against each other to resist compressive stresses, joints within said casing connecting to said tension links, and structural members in said casing supporting the joints.

3. In a link belt for power transmission, the combination of tension links and friction drive links, said friction drive links being composed of a casing having inclined metallic side walls for friction driving surfaces, extensions of said side walls being bent across the link so as to butt against each other to resist compressive stresses, joints within said casing connecting to said tension links, and structural members in said casing supporting the joints, said structural members having projections adapted to be riveted over the extensions of the casing so as to hold the abutting ends in place.

4. In a link belt for power transmission, the combination of tension links, joints for said links, structural members connected to said joints, said structural members having inclined side walls to give a contour of the V type and spaced projections extending upward of the V, and a casing enwrapping said joints and structural members and having ends extending between the spaced projections and hooked around said projections on both sides of the chain so as to hold the casing against both disruptive and compressive stresses.

5. In a link belt for power transmission, the combination of tension links, interspersed friction drive links of the V type, said links composed of internal structural members and an external metal casing presenting a smooth armored surface on the inner and driving faces, said casing being wrapped around the structural members and having ends butted together across the top of the links, and joints connecting the friction drive links to the tension links.

In testimony whereof I have hereunto signed my name this 6th day of October, 1930.

FRANK L. MORSE.